United States Patent

Booth

[15] 3,694,808

[45] Sept. 26, 1972

[54] INSTRUCTION CONTROLLED DIGITAL SIGNAL DISPLAY CIRCUIT

[72] Inventor: William C. Booth, Reisterstown, Md.

[73] Assignee: The Singer Company, New York, N.Y.

[22] Filed: July 28, 1970

[21] Appl. No.: 58,969

[52] U.S. Cl...........340/147 R, 340/168 R, 340/166 R

[51] Int. Cl...........H04q 1/22

[58] Field of Search..........340/147, 168

[56] References Cited

UNITED STATES PATENTS

| | | | |
|---|---|---|---|
| 2,970,763 | 2/1961 | Freeman | 340/168 CC |
| 3,087,144 | 4/1963 | Bianchi | 340/147 C |
| 3,225,342 | 12/1965 | Clark | 340/324 |
| 2,811,713 | 10/1957 | Spencer | 340/147 C |
| 2,972,718 | 2/1961 | Alperin | 340/168 CC |
| 3,147,339 | 9/1964 | Silberg | 340/147 C |
| 3,351,912 | 11/1967 | Collom | 340/147 X |
| 3,444,518 | 5/1969 | Greene | 340/147 |

*Primary Examiner*—Harold I. Pitts
*Attorney*—Francis L. Masselle and William Grobman

[57] ABSTRACT

Digital computers utilize signal lamps on display panels for indicating the contents of the various registers in the computer. Many such displays are multiplexed; that is, the same panel lamps display the contents of all registers. To avoid the continual switching from one register to another, this invention uses in those cases where several registers may be used exclusively from each other a switching circuit which permits the operator to select the register to be displayed or to place the circuitry into a mode which will automatically display the contents of the particular register being used at that time. The circuit uses a selector witch for selection purposes and a matrix of gates for automatic operation.

6 Claims, 1 Drawing Figure

PATENTED SEP 26 1972 3,694,808
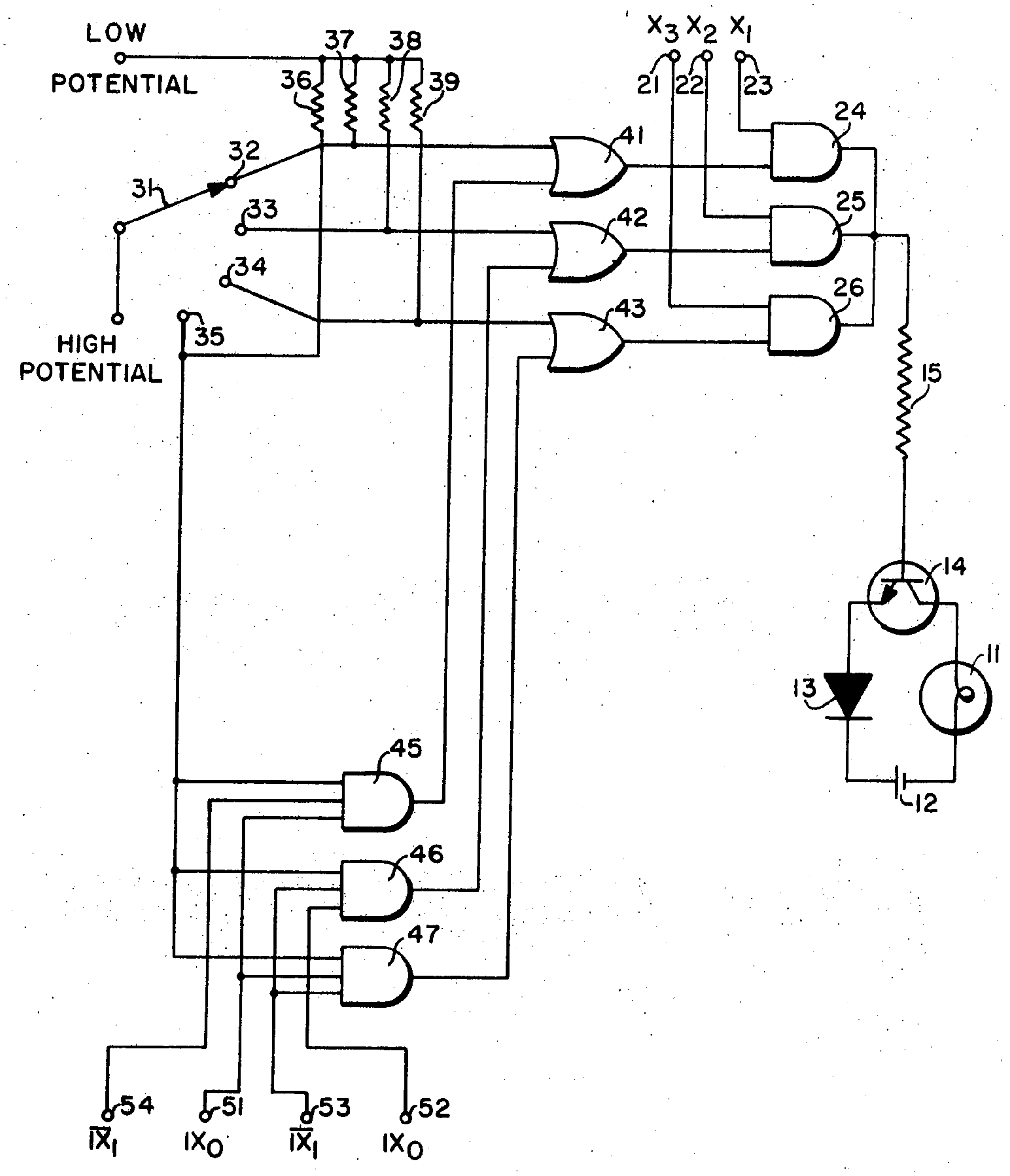
INVENTOR.
WILLIAM C. BOOTH
BY
William Grobman

INSTRUCTION CONTROLLED DIGITAL SIGNAL DISPLAY CIRCUIT

BACKGROUND OF THE INVENTION

1. Field of the Invention

This invention relates to display devices, and more particularly to devices for displaying information contained in data processing circuits.

2. Description of the Prior Art

The operation of digital computers requires means for indicating to the operator the contents of various registers and components, particularly during periods when new programs are being evolved, the apparatus is being tested, or the equipment is under maintenance. Devices which display the contents of the computer components are of particular value when the computer is being repaired or maintained. In those computers where the display is a single bank of lamps which are multiplexed manually to display the contents of all of the computer components, the act of switching itself introduces transients which reduces the reliability of the display. Was the erroneous data in the A register a result of computer malfunction or of switching transients? Therefore, where reliability of display is important, individual displays for each component in the computer is the best arrangement. However, this requires a large amount of display equipment and space, adds to the power consumption of the computer, and increases the amount of heat to be dissipated. Therefore, the use of separate display devices should be kept to a minimum. Where possible, multiplexed displays should be used.

SUMMARY OF THE INVENTION

This invention comprises apparatus in a digital computer for use with a computer control panel for selecting which pulse responsive device in said computer is to have its contents displayed at any time, said apparatus comprising display means, manually operable switch means having at least one movable contact and one fixed contact for connecting any selected pulse responsive device to said display means, and additional means connected to said switch means and selected thereby for automatically connecting to said display means that pulse responsive device which is identified by an instruction being processed by said computer at the time.

It is an object of this invention to provide a new and improved device for displaying the contents of computer components.

It is another object of this invention to provide a new and improved system for displaying the contents of a plurality of computer components with a minimum of transient interference.

It is a further object of this invention to provide a new and improved circuit for accomplishing the selective automatic display of the contents of a plurality of computer components without continually manually switching from one component to another.

BRIEF DESCRIPTION OF THE DRAWING

Other objects and advantages of this invention will become apparent as the following description proceeds, which description should be considered together with the accompanying drawings in which the single figure is a circuit diagram of the display circuit of this invention.

DESCRIPTION OF THE PREFERRED EMBODIMENT

Referring now to the drawing in detail, the reference character 11 designates a signal or display lamp which can be positioned on the computer console for indicating when a one digit register, for example, contains information. The lamp 11 is energized by any suitable source such as the battery 12 through a diode 13 and the emitter-collector circuit of a transistor 14. The base electrode of the transistor 14 is connected through a limiting resistor 15 to the outputs of a group of AND gates 24, 25, and 26. Each of the gates 24, 25, and 26 has two inputs, with one input of the gate 24 connected to a terminal 23 for connection to the output of a register X1, one input of the gate 25 connected to a terminal 22 for connection to the output of a register X2, and one input to the gate 26 connected to a terminal 21 for connection to the output of a gate X3. The other input to gate 24 is connected to the output of an OR gate 41, the other input to gate 25 is connected to the output of an OR gate 42, and the other input of gate 26 is connected to the output of an OR gate 43. Each of the gates 41, 42, and 43 has two inputs with one input to gate 41 connected to a stationary contact 32, one input to gate 42 being connected to a stationary contact 33 and one input to gate 43 being connected to a stationary contact 34, all of a rotary switch 31. The other input to gate 41 is connected to the output of an OR gate 45, the other input to gate 42 is connected to the output of an AND gate 46 and the other input to gate 43 is connected to the output of an AND gate 47. A fourth stationary contact of the rotary switch 31 is connected to one input of each of the gates 45, 46, and 47. The other two inputs to each of the gates 45, 46, and 47 are connected in combinations to terminals 51, 52, 53, and 54 to which are applied the four conditions which represent the binary address in an instruction of which of the three registers X1, X2, and X3 is being used. The terminals 51–54 in this specification represent the register identification output lines from the instruction register in the computer of which this display is a part. The terminal 51 is connected to an input of the gate 45, the terminal 52 is connected to one input of each of gates 46 and 47, the terminal 53 is connected to the input to gate 46, and the terminal 54 is connected to an input of each of gates 45 and 47. The stationary contacts 32, 33, 34, and 35 are connected to a source of low potential through individual limiting resistors 36, 37, 38, and 39, and the movable contact 31 of the rotary switch is connected to a source of higher potential.

In operation, the rotary switch 31 is manually set so that the high potential through the movable contact 31 is applied to a selected one of the stationary contacts 32, 33, or 34. Assume that the movable contact is set as shown in the figure to select register X1 to be displayed. Then the high potential is applied to one input of the gate 41. The gates 41, 42, and 43 are OR gates which means that when either input to a gate is high, the output of that gate is high. For any other condition, the output of the gate is low. Thus, with a low output signal from the gate 45, and with the high potential from the stationary contact 32, the gate 41 is opened to apply a high signal to the input of the gate 24. Should the X1 register contain a one, the terminal 21 is high and the gate 24 opens to apply a signal to the transistor 14 through the resistor 15. The transistor conducts, permitting current to flow from the battery 12 through the lamp 11 which indicates that the selected register contains a one. Should the register X1 contain a zero, then the terminal 21 would be low, the gate 24 would not open and the lamp 11 would remain unlit. Similarly, since neither of the other gates 42 or 43 have the high potential applied to their input, they are closed and their outputs are low, preventing either of the gates 25 or 26 from opening to light the lamp 11. Thus, the rotary switch 31 may be used to select one of the registers X1, X2, or X3 to have its contents displayed by the lamp 11.

Consider now, however, the situation when the movable contact 31 is moved so as to apply the high potential to the stationary contact 35 for automatic operation. This applies a high potential to all of the gates 45, 46, and 47. Whenever any of the gates 45, 46, and 47 receives two additional high potential signals from the input terminals 51, 52, 53, and 54, that gate opens to pass a high signal to the appropriate gate 41, 42, or 43. The chosen gate opens, and the signal lamp 11 lights, when appropriate. That portion of the instruction in the instruction register which identifies the selected register X1, X2, or X3 is applied to the terminals 51–54. Assume that register X1 is identified by $IX_1 = 0$ and $IX_0 = 1$; register X2 is identified by $IX_1 = 0$ and $IX_0 = 1$; and register X3 is identified by $IX_1 = 1$ and $IX_0 = 1$. Then if terminal 51 is high, and terminals 52 and 53 are low, gate 45 is opened and register X1 is identified. When gate 45 is opened, it applies a high potential to the input of gate 41 which opens and applies a high potential to gate 24. If the content of register X1 is a one, gate 24 opens and lamp 11 lights. If the content of register X1 is zero, then lamp 11 remains dark.

The apparatus shown in the figure and described above provides a system whereby the operator of a computer or other similar device may manually select which register he wishes to observe by means of panel lights, and which also, in the case where several registers are used exclusively of each other, provides him with the means to automatically display the contents of that register or other component which is to be used in accordance with the instruction. As the instructions being carried out vary, the register whose contents are being displayed also varies. This permits viewing the contents of the register in use without the disadvantages caused by manual switching of the panel light connections. It is realized that the above description may indicate to those in the art additional ways in which the apparatus of this invention may be utilized without departing from its principles and spirit. It is, therefore, intended that this invention be limited only by the scope of the appended claims.

What is claimed is:

1. In a digital computer, apparatus for use with a computer control panel for selecting which pulse responsive device in said computer is to have its contents displayed at any time, said apparatus comprising display means, manually operable switch means having at least one movable contact and one fixed contact for connecting any selected pulse responsive device to said display means, and additional means connected to said switch means and selected thereby for automatically connecting to said display means that pulse responsive device which is identified by an instruction being processed by said computer at the time.

2. The apparatus defined in claim 1 wherein said switch means includes electronic switches responsive to the setting of said manually operable switch means, said electronic switches including first gating means having at least one input connected to said manually operable switch means and an output connected to said display means.

3. The apparatus defined in claim 2 wherein said means for automatically connecting said pulse responsive devices to said display means includes means for receiving identification of the pulse responsive device identified at any time by an instruction, second gating means for conditioning said first gating means, means for translating said identification into conditioning signals for opening the proper second gating means, and selectable means on said manually operable switch means for applying a signal to said second gating means and thereby selecting said automatic mode of operation.

4. The apparatus defined in claim 1 further including a first gating means having at least one input connected to said switch and another input connected to each of said pulse responsive devices, and means for connecting the output of said first gating means to said display means so that the pulse responsive device selected by said switch is connected to said display means.

5. The apparatus defined in claim 4 wherein said automatically connecting means comprises a second gating means, means for receiving identification of the pulse responsive device being used at any time, means for connecting said receiving means to at least one input of said second gating means, means for connecting said switch to a second input of said second gating means, and means for connecting the output of said second gating means to the input of said first gating means so that the pulse responsive device being used automatically connected to said display means in response to said identification.

6. Apparatus for displaying the contents of any of several digital data processing devices, said apparatus comprising a first group of gates, means for connecting one input of each of said first group of gates to individual devices whose contents are to be displayed, a manually settable switch means having several positions, means for connecting another input of each of said first gates to individual positions, of said switch means for connecting the outputs of all of said first gates to said display means, a decoding matrix, a second group of gates, means for connecting at least one input of each of said second gates to individual locations on said matrix, means for applying to said matrix digital identification of the device which is being used at any time, means for connecting another input of each of said second gates to one position of said switch means so that said gates receive therefrom a conditioning signal, and means for connecting the outputs of the individual second gates to the inputs of corresponding first gates, so that when said switch is set to condition said second gates, the device whose identification is decoded by said matrix is connected to said display.

* * * * *